March 8, 1938.  J. B. SAUSSE  2,110,404
COUPLING
Filed Aug. 19, 1936
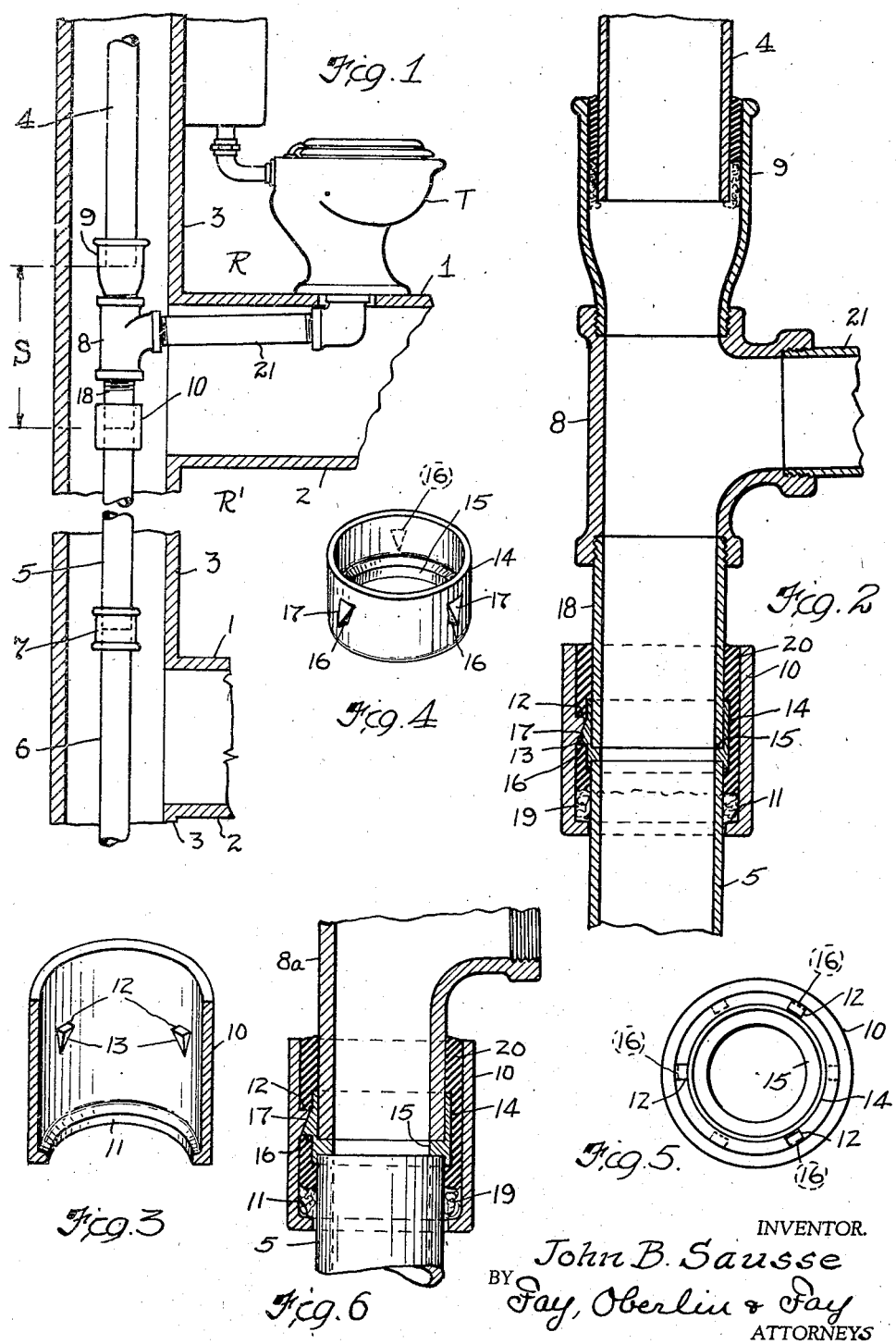
INVENTOR.
John B. Sausse
BY Fay, Oberlin & Fay
ATTORNEYS Patented Mar. 8, 1938

2,110,404

UNITED STATES PATENT OFFICE 2,110,404

COUPLING

John B. Sausse, Cleveland, Ohio

Application August 19, 1936, Serial No. 96,830

4 Claims. (Cl. 285—114)

This invention relates, as indicated, to couplings, but has reference more particularly to couplings of the type used in waste lines and similar conduits of office buildings.

In the construction of office buildings in which waste lines and similar conduits are run through walls or pilasters, it is customary to form such waste lines of sections of uniform length which are threaded at their ends and joined by ordinary threaded couplings or unions or by Y-branched fittings, where connection from such line to a toilet or washstand is required.

After completion of the building, however, it frequently becomes necessary to install a toilet or washstand in a room where such facilities did not previously exist, in which case a connection to the waste line must be made. In making such a connection, it is necessary to remove a portion of the waste line as by severing same from the line, rethread the exposed end of the lower section of the line, connect to such threaded end a Y-branched fitting and then connect the upper end of such fitting to the end of the upper section of the line by means of a special fitting suitable for making a caulked joint.

Not infrequently, however, access to the waste line for the purpose of threading the exposed end of the lower section becomes extremely difficult, and in many cases, it becomes necessary to break through the ceiling, walls or pilaster in the room below that in which the toilet or washstand is to be installed, so that the lower section of the line may be unscrewed from the lower coupling or Y-branched fitting and taken to a pipe shop for rethreading. Where the walls are of concrete or the like, the expense of such a procedure is rather high, to say nothing of the inconvenience and loss of time caused to tenants.

It is a primary object of the present invention to provide a novel form of joint or coupling for waste lines and the like, by the use of which a considerable savings in labor is effected in the installation of toilets, washstands and the like in office buildings, and a minimum of inconvenience caused to tenants of the building.

More specifically, it is an object of the invention to provide a joint or coupling for such lines which will not necessitate the removal of sections of the line from the walls or pilaster when establishing a connection from the line to a toilet or washstand.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a fragmentary vertical cross-sectional view of an installation embodying the novel features of the invention; Fig. 2 is an enlarged cross-sectional view of a portion of the waste conduit shown in Fig. 1; Fig. 3 is a sectional perspective view of a sleeve member which forms an element of the novel joint or coupling of the invention; Fig. 4 is a perspective view of a collar which forms an element of the joint; Fig. 5 is a plan view showing the manner in which the collar and sleeve are assembled; and Fig. 6 is a view of a slightly modified form of the joint.

Referring more particularly to Figs. 1 to 5 inclusive, there is illustrated more or less diagrammatically a building including floors 1, ceilings 2 and walls or pilasters 3. Disposed behind the walls or pilasters is a drainage or waste conduit consisting of sections 4, 5 and 6, which, during erection of the building are connected at their ends as by means of threaded unions or couplings 7, or by Y-branched fittings, where connection from such conduit to a toilet or washstand is required.

In Fig. 1, there is shown a toilet T, which is installed in a room R, where such facilities did not previously exist. In installing this toilet, it has heretofore been the practice to sever, as by means of a hacksaw, a portion of the conduit designated S, and to remove this severed portion. The upper end of section 5, below the point of severance, is then threaded, and a Y-drainage fitting, such as the one designated 8 is then secured to this section, a special fitting, such as that designated 9 being then employed to fill the space between the upper end of fitting 8 and the severed end of section 4 of the drainage conduit. A suitable connection is then made from the fitting 8 to the toilet.

Access to the section 5, for the purpose of threading the upper end of same, usually requires breaking through the floor 1, ceiling 2 and wall or pilaster 3, so that this section may be unscrewed from the coupling 7 and taken to a pipe shop for threading. This involves considerable expense and necessitates shutting down of the waste line for long periods and inconvenience to all of the tenants using this drainage line and particularly to the tenant in the room R' below the room where the installation is being made.

Instead of making the installation in the manner described, I proceed in the following manner:

A sleeve 10 is provided which is in the form of a cylindrical casting having an inwardly extending flange 11 at its lower end and a plurality of circumferentially spaced lugs 12 intermediate its ends, each of the lugs 12 having an inclined lower surface 13. The internal diameter of the flange 11 is such that the sleeve 10 may be easily slipped over the upper end of section 5 of the conduit, but without excessive clearance between the flange and external surface of such conduit section. The sleeve 10 is slipped downwardly over the conduit section to a point somewhat below the upper end of said section.

A collar 14 is then provided which is in the form of a cylindrical casting having at a point spaced somewhat from its lower end an inwardly extending flange 15, whereby the collar may be positioned on the upper end of the conduit section 5, the portion of the collar which extends below the flange 15 engaging the exterior wall of the conduit section and preventing lateral displacement of the collar when the latter is in position, as clearly shown in Fig. 2. The collar 14 is also provided on its external surface with a plurality of circumferentially spaced lugs 16 intermediate its ends, each of these lugs having an inclined upper surface 17.

With the lugs 12 out of alignment with the lugs 16, as shown in dotted lines in Fig. 5, I elevate the sleeve 10 sufficiently to bring the lugs 12 above the level of lugs 16, and then rotate the sleeve 10 sufficiently to bring such lugs into alignment with the lugs 16, as shown in solid lines in this figure. Upon lowering the sleeve 10, the inclined surfaces 13 of the lugs 12 will rest upon the inclined surfaces 17 of the lugs 16.

With the sleeve 10 thus positioned on the collar, a nipple or short length of pipe 18 of the same diameter as the conduit section 5 is then mounted on the flange 15 of the collar, the nipple extending somewhat above the upper end of the sleeve, and having its upper end threaded.

With the elements thus positioned, a quantity of oakum 19 is inserted in the space between the sleeve 10 and conduit 5 and tamped down upon the flange 11. Molten lead 20 is then poured into the space between the sleeve 10 and walls of the elements which such sleeve surrounds to form a caulked joint, in which the lead surrounds the lugs 12 and 16 and therefore prevents relative displacement of the sleeve and collar.

The Y-branched fitting 8 is then secured to nipple 18 and the special fitting 9 is then threadedly secured to the upper end of fitting 8. The upper end of fitting 9 is flared sufficiently to enable a caulked joint to be formed between this fitting and the lower end of conduit section 4. The connection to the toilet T is then completed, as by means of a conduit 21.

It will be noted that an installation, such as has been described, may be quickly and easily made, by merely removing a portion of the floor 1, and without necessitating removal of conduit section 5 or breaking through the ceiling or walls in room R'. A considerable saving in expense and time is thus effected with a minimum of inconvenience to tenants of the building.

In Fig. 6, there is shown a connection in which the lower end of the Y-branch fitting 8a is unthreaded and is sufficiently long to extend to the flange 15, thus permitting the formation of a caulked joint at this point and dispensing with the use of the nipple 18.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A conduit joint comprising aligned conduit sections, a collar in engagement with one end of each of said conduit sections, a sleeve independent of said conduit sections surrounding said collar and joint sealing elements disposed between said collar and sleeve.

2. A conduit joint comprising aligned conduit sections, a collar embracing the ends of each of said sections, and a sleeve independent of said conduit sections surrounding said collar, said sleeve and collar having interengaging lugs for locating said sleeve and collar in desired longitudinal relation with each other.

3. A conduit joint comprising axially aligned conduit sections, a collar embracing end portions of said sections and having a flange engaging the ends of the respective conduit sections, and lugs on the exterior surface thereof, a sleeve spaced from and surrounding said collar, said sleeve having lugs resting on the lugs of said collar, and a metallic joint sealing material filling the space between said collar and sleeve and locking the lugs of the sleeve to those of the collar.

4. A conduit joint comprising aligned conduit sections, a collar embracing end portions of said sections and having lugs on the exterior surface thereof, a sleeve spaced from and surrounding said collar, said sleeve resting on the lugs of said collar, and a joint sealing material filling the space between said collar and sleeve and locking said sleeve to the lugs of the collar.

JOHN B. SAUSSE.